US008380793B2

(12) United States Patent
Shahine

(10) Patent No.: US 8,380,793 B2
(45) Date of Patent: Feb. 19, 2013

(54) AUTOMATIC NON-JUNK MESSAGE LIST INCLUSION

(75) Inventor: Omar Shahine, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 12/205,648

(22) Filed: Sep. 5, 2008

(65) Prior Publication Data

US 2010/0064011 A1    Mar. 11, 2010

(51) Int. Cl.
*G06F 15/16* (2006.01)
(52) U.S. Cl. .................. 709/206; 709/224; 709/217
(58) Field of Classification Search .............. 709/206, 709/217, 225, 224; 705/67
See application file for complete search history.

(56) References Cited

U.S. PATENT DOCUMENTS

| | | | |
|---|---|---|---|
| 6,353,852 B1 * | 3/2002 | Nestoriak et al. | 709/206 |
| 6,377,936 B1 * | 4/2002 | Henrick et al. | 705/14.69 |
| 6,421,709 B1 * | 7/2002 | McCormick et al. | 709/206 |
| 6,434,600 B2 * | 8/2002 | Waite et al. | 709/206 |
| 6,779,021 B1 * | 8/2004 | Bates et al. | 709/206 |
| 6,839,680 B1 * | 1/2005 | Liu et al. | 705/7.33 |
| 7,222,158 B2 * | 5/2007 | Wexelblat | 709/206 |
| 7,243,105 B2 * | 7/2007 | Thint et al. | 1/1 |
| 7,299,261 B1 * | 11/2007 | Oliver et al. | 709/206 |
| 7,366,761 B2 * | 4/2008 | Murray et al. | 709/206 |
| 7,516,182 B2 * | 4/2009 | Goldman | 709/206 |
| 7,519,708 B2 * | 4/2009 | Malik | 709/225 |
| 7,546,348 B2 * | 6/2009 | Wilson et al. | 709/206 |
| 7,571,220 B1 * | 8/2009 | Ng | 709/219 |
| 7,660,857 B2 * | 2/2010 | Smith et al. | 709/206 |
| 7,904,558 B2 * | 3/2011 | Malik | 709/225 |
| 2002/0004826 A1 * | 1/2002 | Waite et al. | 709/223 |
| 2003/0172167 A1 * | 9/2003 | Judge et al. | 709/229 |
| 2003/0172294 A1 * | 9/2003 | Judge | 713/200 |
| 2003/0191772 A1 * | 10/2003 | Schaumann et al. | 707/102 |

(Continued)

FOREIGN PATENT DOCUMENTS

WO    2005/066826 A1    7/2005
WO    2005/101770 A1    10/2005

OTHER PUBLICATIONS

Unknown, "Add AmericanAdoptions.com to Your Email 'Safe List' or Personal Address Book," available at http://www.americanadoptions.com/adoption/add_to_safelist, printed on Jul. 7, 2008, 3 pages.

(Continued)

*Primary Examiner* — Firmin Backer
*Assistant Examiner* — Michael A Chambers
(74) *Attorney, Agent, or Firm* — Senniger Powers LLP

(57) ABSTRACT

Method to effectively include a transaction electronic mail (e-mail) message to a non-junk mail list of an email account of a user. The method includes interacting with the user to start to complete a business transaction at a transaction web site of a party. A confirmation step is defined to be a second to last step in a plurality of transaction steps to complete the business transaction. A request associated with the defined confirmation step is provided to the user and the request includes adding a transaction e-mail address to the non-junk mail list. The e-mail account is further received from the user, and properties of the received e-mail account are identified. The method further interacts with the user to log-in to the received e-mail account and interacts with the user to include the transaction e-mail address to the non-junk mail list of the e-mail account of the user.

17 Claims, 12 Drawing Sheets

U.S. PATENT DOCUMENTS

| | | | |
|---|---|---|---|
| 2003/0212791 A1* | 11/2003 | Pickup | 709/225 |
| 2004/0111480 A1* | 6/2004 | Yue | 709/206 |
| 2004/0143635 A1* | 7/2004 | Galea | 709/206 |
| 2004/0196968 A1* | 10/2004 | Yue | 379/210.02 |
| 2005/0033810 A1* | 2/2005 | Malcolm | 709/206 |
| 2005/0080642 A1* | 4/2005 | Daniell | 705/1 |
| 2005/0144239 A1* | 6/2005 | Mattathil | 709/206 |
| 2005/0164704 A1* | 7/2005 | Winsor | 455/432.3 |
| 2005/0171799 A1* | 8/2005 | Hull et al. | 705/1 |
| 2005/0182735 A1* | 8/2005 | Zager et al. | 705/67 |
| 2005/0188036 A1* | 8/2005 | Yasuda | 709/206 |
| 2005/0228680 A1* | 10/2005 | Malik | 705/1 |
| 2005/0267944 A1* | 12/2005 | Little | 709/207 |
| 2006/0010217 A1 | 1/2006 | Sood | |
| 2006/0031333 A1* | 2/2006 | O'Neill | 709/206 |
| 2006/0036701 A1* | 2/2006 | Bulfer et al. | 709/206 |
| 2006/0101118 A1* | 5/2006 | Yabe et al. | 709/206 |
| 2006/0136344 A1* | 6/2006 | Jones et al. | 705/402 |
| 2006/0212522 A1* | 9/2006 | Walter et al. | 709/206 |
| 2006/0271669 A1* | 11/2006 | Bouguenon et al. | 709/224 |
| 2008/0005249 A1* | 1/2008 | Hart | 709/206 |
| 2008/0104186 A1* | 5/2008 | Wieneke et al. | 709/206 |
| 2008/0120378 A2* | 5/2008 | Smith | 709/206 |
| 2008/0209514 A1* | 8/2008 | L'Heureux et al. | 726/3 |
| 2008/0214157 A1* | 9/2008 | Ramer et al. | 455/414.1 |
| 2009/0164235 A1* | 6/2009 | Malik | 705/1 |
| 2010/0049790 A1* | 2/2010 | Schreiber | 709/203 |

OTHER PUBLICATIONS

Mijatovic, Vladimir, "Mechanisms for Detection and Prevention of Email Spamming," available at http://nwps.ws/pub/files/Report-p2p-spam-2003.pdf#pages=135, 2003, 12 pages.

Unknown, "Email Whitelist," available at http://www.universityofinternetscience.com/index.php? option=com_content&task=view&id=124&Itemid=161, printed on Jul. 7, 2008, 2 pages.

Unknown, "Add This: The #1 Bookmarking and Sharing Button," available at http://addthis.com, printed on Aug. 4, 2008, 1 page.

* cited by examiner

FIG. 2

CONFIRMATION

ORDERING PROGRESS
①→②→③→④     *202*

THE FOLLOWING CONFIRMS YOUR ORDER INFORMATION:

ORDER SUMMARY

ITEM:
    SKU: XBOX 360-2008
    NAME: XBOX 360 CONSOLE 60GB
    QUANTITY: 1
    UNIT PRICE: $349.00     *204*

SHIPPING ADDRESS:
    GAME ZONE
    1234 GAMEWAY
    SAINT LOUIS, MO 63102

BILLING ADDRESS: (SAME AS SHIPPING ADDRESS)

PAYMENT:

CREDIT CARD: MC **--**-1234; EXP: 12/12

GIFT OPTION: N/A

PROMOTION/DISCOUNT: N/A

INCLUDE SHIPPING CONFIRMATION E-MAIL IN YOUR NON-JUNK MAIL LIST:     *252*

SHIPPING@MERCHANT.COM

*208* — [YES HELP ME ADD IT TO MY NON-JUNK MAIL LIST]     *210* — [NO, IT IS ALREADY ON THE NON-JUNK MAIL LIST]

CONFIRMATION

ORDERING PROGRESS

① → ② → ③ → ④    202

─ 222

ENTER YOUR E-MAIL ADDRESS: [_____]
                              ─ 224
OR

SELECT FROM ONE OF THE FOLLOWING:

[_____] @ HOTMAIL.COM ▼
  ─ 226       ─ 228

─ 230
[ NEXT ]

FIG. 9

ORDER COMPLETE

ORDERING PROGRESS  ①→②→③→④   202

YOUR ORDER HAS BEEN COMPLETED. THANK YOU FOR YOUR PURCHASE!

ITEM:
    SKU: XBOX 360-2008
    NAME: XBOX 360 CONSOLE
    QUANTITY: 1
    UNIT PRICE: $349.00

SHIPPING ADDRESS:
    GAME ZONE
    1234 GAMEWAY
    SAINT LOUIS, MO 63102

BILLING ADDRESS: (SAME AS SHIPPING ADDRESS)

PAYMENT:

CREDIT CARD: MC **--**-1234; EXP: 12/12

GIFT OPTION: N/A

PROMOTION/DISCOUNT: N/A

⋮

— 900

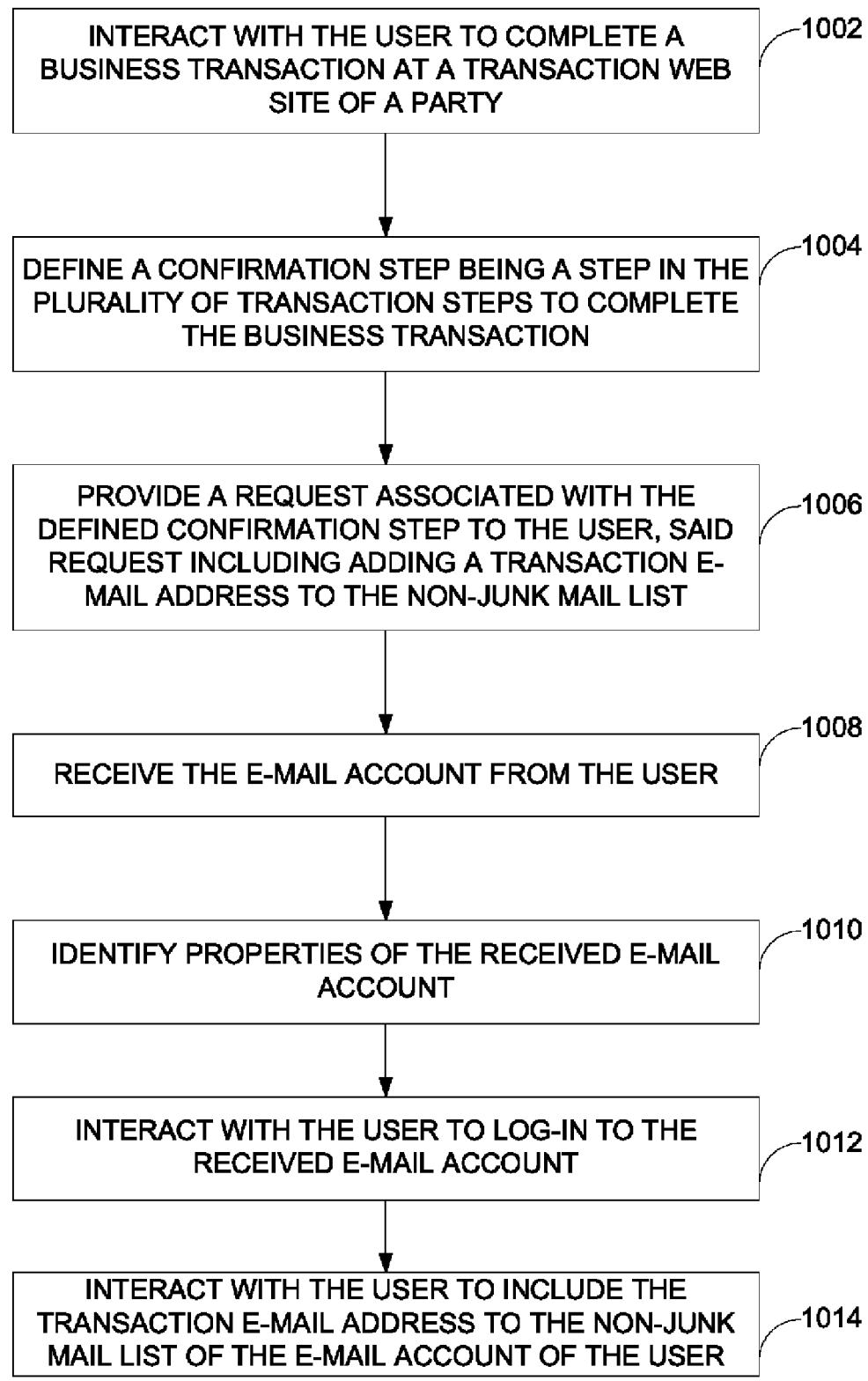

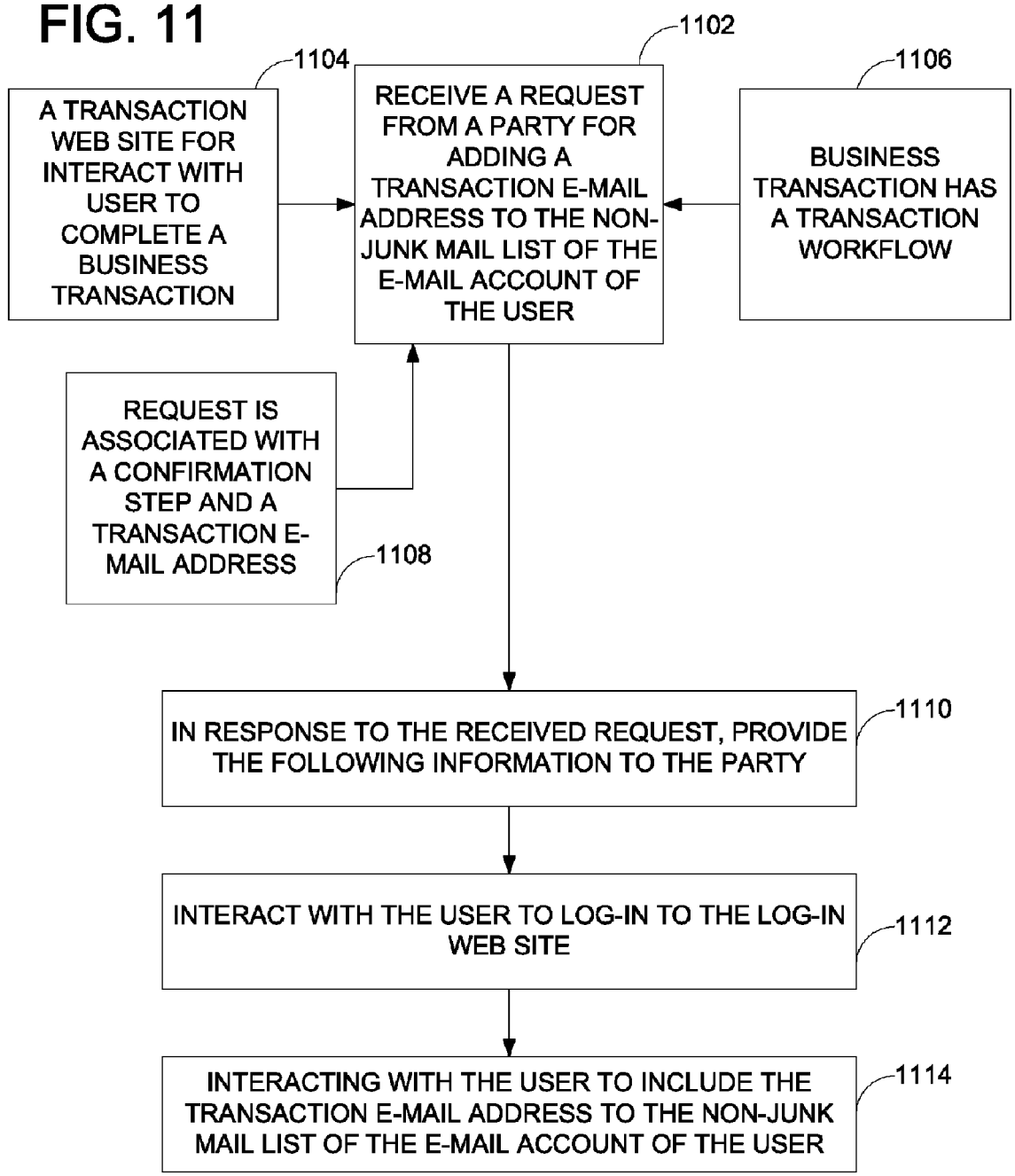

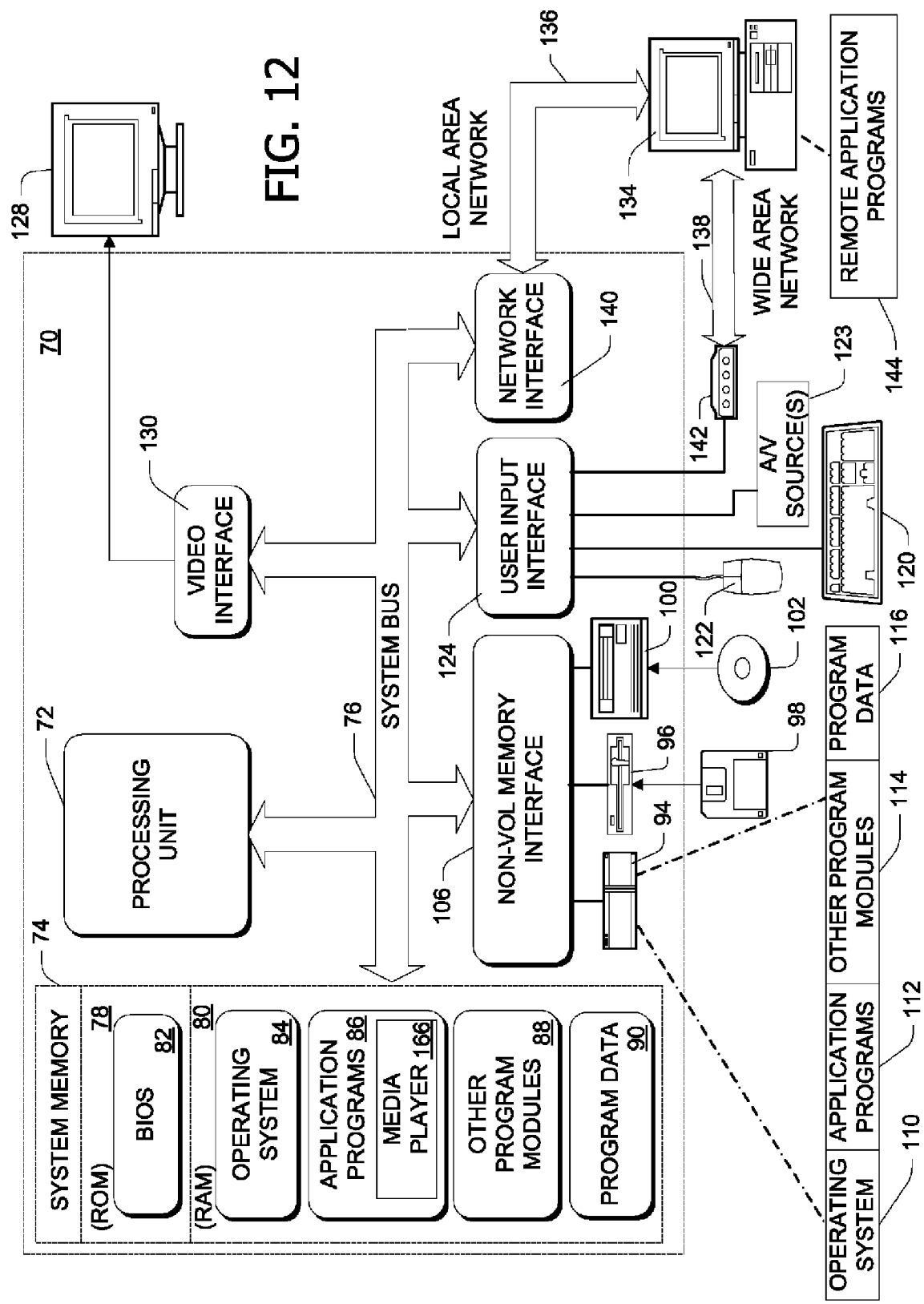

AUTOMATIC NON-JUNK MESSAGE LIST INCLUSION

BACKGROUND

Electronic mail (e-mail) usages have become omnipresent in everyday use for online users. Commercial senders or merchants send many of the messages that users receive in their e-mail accounts. These messages include account signup confirmations, order confirmations, receipts, shipping status and newsletters. In other cases, users wish to receive these sorts of messages in their inbox, such as shipping notifications. On the other hand, the users do not want messages to distract them or they are simply uninterested in receiving the messages, such as a newsletter.

Currently, users face at least the following unfortunate situations: 1. E-mail messages that the user wishes to see are forwarded to the junk folder. For example, this includes messages relating to account signup confirmations, account signup verifications, order confirmation, order status, and shipping confirmation. 2. E-mail messages that the user does not wish to receive (but are legitimate) are marked as junk, such as newsletters, sales e-mail messages, e-mail messages that the users might be interested in.

In the first situation, it is problematic because the merchants wish those messages are indeed delivered, because the merchants do not wish to receive inquiries from users who are expecting to receive these types of e-mail messages. In this case, both the sender and the recipient have an interest in the message being delivered to the inbox without being marked as spam or junk. This is also especially true for any website that requires account signup verification.

Both parties would like a solution (senders and recipients) to these problems. Solutions to date have relied on rudimentary tools and don't work very effectively. For example, users end up using a blunt tool (such as the junk button and blacklist) to make the problems go away, which further complicates the ability to receive legitimate messages from the sender.

Some senders try to address this situation by including instructions on how to add the sender to the safelist or whitelist, by joining the sender score certified program, or by using SenderID. Unfortunately, these solutions are not widely adopted and result in frustration on the user and sender's part. Some users may not follow the instructions correctly. Other attempts take a different approach by petitioning to the users in response to receiving the user's e-mail address/account. However, many times users wish to use different e-mail addresses for receiving such types of e-mail messages from those used when signing up or registering the user accounts for online purchases.

SUMMARY

Embodiments of the invention attempt to solve the problem by including a step in the workflow of a transaction to include the desirable e-mail address in a non-junk mail list of a user. Embodiments of the invention further leverage a model that has XML feeds (e.g., feed flair) to add the sender's address (es) to the recipient's safe list as well as configure any rules or filtering appropriately. Additional embodiments provide a standard uniform resource locator (URL) pattern that any third party can use to direct users to safelist the originator's email address. Any email provider can then expose this address and allow end users to safelist messages before they are sent to the recipient through a custom workflow.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 2-9 are exemplary block diagrams illustrating processes to effectively include a transaction e-mail address to a non-junk mail list of a user according to an embodiment of the invention.

FIG. 10 is an exemplary flow chart illustrating operation of effectively including a transaction e-mail address to a non-junk mail list of a user according to an embodiment of the invention.

FIG. 11 is an exemplary flow chart illustrating operations of effectively including a transaction e-mail address to a non-junk mail list of a user by an e-mail provider working in cooperation with a party transacting with the user according to an embodiment of the invention.

FIG. 12 is a block diagram illustrating one example of a suitable computing system environment in which the invention may be implemented.

Corresponding reference characters indicate corresponding parts throughout the drawings.

DETAILED DESCRIPTION

Figure 1:
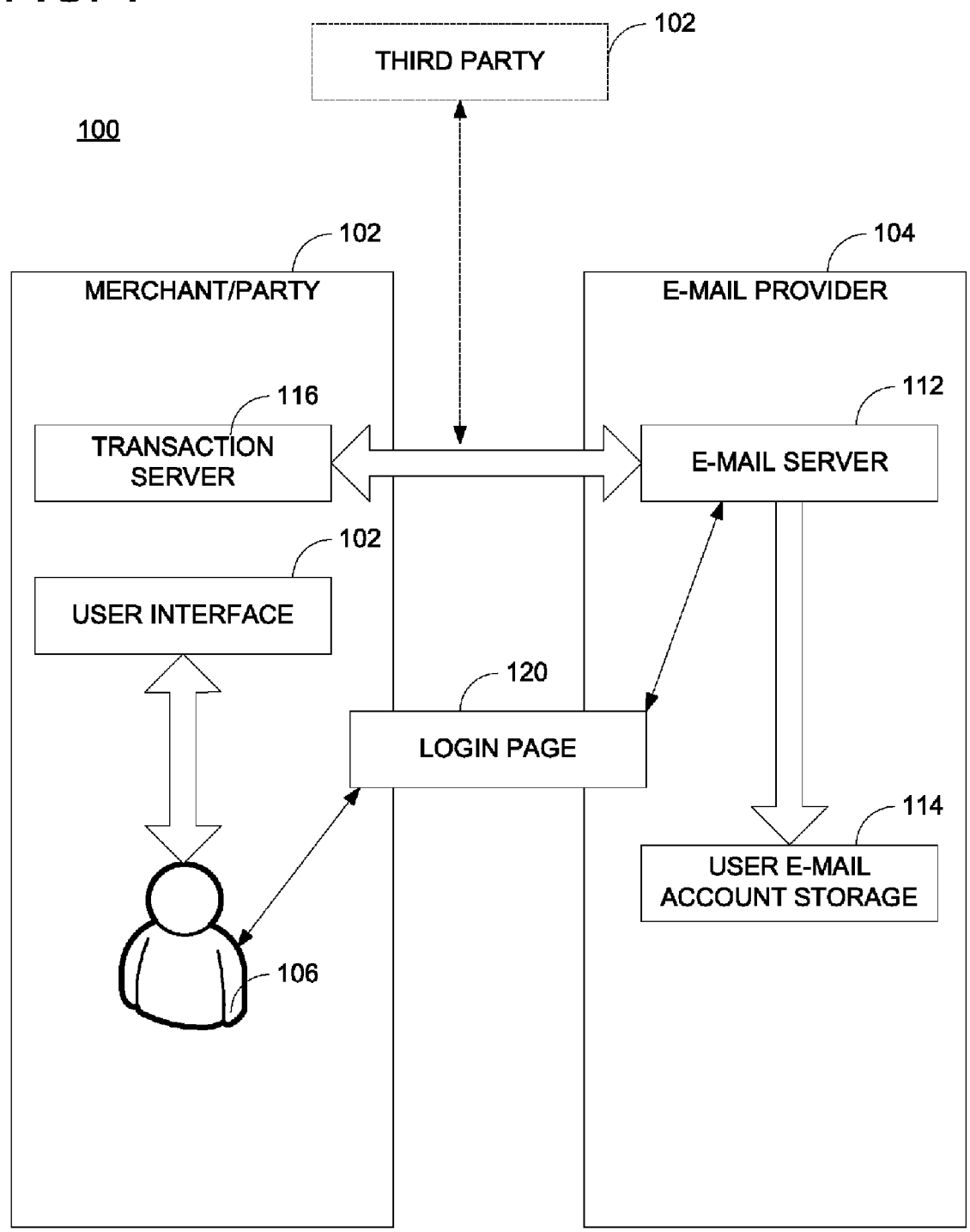
FIG. 1 is a block diagram illustrating an exemplary embodiment of a system to effectively include a transaction e-mail address to a non-junk mail list of a user according to an embodiment of the invention.

Referring now to FIG. 1, a block diagram illustrates an exemplary embodiment of a system 100 to effectively include a transaction e-mail address 252 to a non-junk mail list of a user according to an embodiment of the invention. The system 100 includes at least one party 102 and at least one e-mail provider 104. In one example, the party 102 may be an online merchant that provides services and merchandize for sale to an online user 106. In another example, the party 102 may be a provider of online subscriptions that interacts with the online user 106. Also, the at least one e-mail provider 104 may be the e-mail provider for an e-mail account for the online user 106.

The at least one party 102 uses at least one transaction server 110 for providing the services to the user. In one embodiment, the transaction server 110 may be server computer, a cluster of server computers, computers in a distributed environment, or a cluster of networked, loosely-coupled computers acting in concert to perform tasks. In another embodiment, the transaction server 110 may be a computer 130 illustrated in FIG. 12. Similarly, the e-mail provider 104 may also employ a server 112 which may be similar to the transaction server 110. For example, the server 112 may include a web server, a database server, a front-end server, a back-end server, or the like. In one embodiment, a memory storage 114 is accessible to the server 112 which provides data storage for e-mail accounts, including the e-mail account of the online user 106.

In one embodiment, the user 106 interacts with a user interface (UI) 116 hosted or provided by the transaction server 110 to access the services provided by the party 102. In one example, the service may be an online purchase or online subscription. As such, by interacting with the online purchase service or online subscription service, the user 106 may perform one or more of the following actions: browse through product selection or offerings, select a desirable product, merchandize or scription title, provide payment and shipping information when appropriate and confirm one or more previous actions before completing the transaction. In the online purchase example, the merchant or party 102 typically has a set of steps or a workflow of online purchase steps that one purchaser needs to complete before the online purchase is completed. These online purchase steps include at least one of the following: selecting desirable items, entering payment or shipping information, entering optional gift or special request information, entering discount or coupon information, and confirming purchase order information. FIGS. 2-9 describe how embodiments of the invention can be incorporated into the purchase workflow in further detail.

Referring now to FIG. 2, an exemplary diagram illustrates a typical online purchase order workflow having embodiments of the invention included therein. For example, a web page 200 describes a confirmation page/step defined by the party 102. For example, the confirmation page defines a step or a status 202 in the transaction that the party 102 determines the transaction has reached a stage where additional input from the user 106 is beneficial, in particular with respect to including transaction e-mail addresses from the party 102. In this example, the confirmation step/stage is in the 3 stage (denoted in the status 202 with an underline underneath the number "3"). That is, the user 106 has started or initiated the process from step 1 through step 2 before reaching step 3. The web page 200 also includes a summary 204 of the order. In the situation involving online purchasing transactions, the transaction e-mail addresses include e-mail addresses from the party relating to shipping notification, order confirmation, shipping update, changes to orders, order cancellation confirmation, order returns, and order refunds. In other examples such as online subscription transactions, transaction e-mail addresses include e-mail addresses relating to subscription confirmation, subscription cancellation, subscription renewals, etc. In a further example, online forums or other services that require an online account use transaction e-mail addresses to send e-mail messages to users relating to account sign-up confirmation, account information change confirmation, etc. Not only do these e-mail addresses change over time but also users may change addresses overtime or users may decide to organize e-mail accounts for different purposes. For example, the user may wish to set up an account which receives all shipping confirmation e-mail messages. In another example, the user may use an account for order confirmation e-mail messages.

As such, embodiments of the invention effortlessly integrate aspects of the invention into the existing transaction workflows of the party 102 by incorporating a dialog box 206 or the like as a request on the web page 200 to facilitate the inclusion of the transaction e-mail address 252 to the non-junk mail list of the e-mail account of the user 106. By including the transaction e-mail address 252 to the non-junk mail list, the party 102 can ensure that whatever communication that the party wishes to communicate with the user 106 via the transaction e-mail address 252 is delivered to the user 106. As such, the box 206 includes a first button 208 which asks the user to indicate that he or she wishes to add the transaction e-mail address 252 to the non-junk mail list. A second button 210 indicates that the user has already added the transaction e-mail address 252 to the non-junk mail list and can proceed to the next step in the workflow. Other buttons or controls that facilitate the request may be used or added without departing from the scope of the invention.

Referring now to FIG. 3, another page 220 may be presented to the user 106 to enter the e-mail account where the user 106 wishes to receive transaction relating information from the transaction e-mail address 252 from the party 102. The user 106 may enter the e-mail account by typing the complete e-mail address (username and domain name separated by a symbol "@") in a field 224 or by enter a username in a field 226 and choose an appropriate domain name from a field 228. The party 102 and the e-mail provider 104 may collaborate together to make the addition or inclusion of the transaction e-mail address 252 to the non-junk mail list even more effective. In one embodiment, after entry of the fields 224 or 226 and 228, the user 106 selects a next button 230 to proceed to the next stage. Upon receiving an indication from the user 106 that the next button 230 has been activated (i.e., depressed by the user via an input device or touch), the party 102 transmits the information or data from the fields 224, 226 or 228 to the e-mail provider 104 such that the e-mail provider 104 generates a link for the party 102 to direct the user 106 to log into the e-mail account. The generated link identifies the e-mail provider 104 and a receiving component within the server 112 that is capable to handle such a request of including the transaction e-mail address 252 to the user's non-junk mail list. For example, the generated link may be in the form of a uniform resource locator (or uniform resource identifier) (URL) link having at least the following information: a domain of the e-mail address, an end point that processes the provided request and the e-mail account (e.g., username) of the user 106. In one embodiment the URL link include the following pattern:

http://<yourDomain>/
<endpoint>?address=<emailAddress>&company=<companyName>&description=<

For example, the "<yourDomain>" may indicate the domain name of the e-mail provider 104. "<endpoint>" may indicate the processing component or function that can process such a request. "<emailAddress>" may indicate the e-mail address of the user 106. "<companyName>" may indicate the name of the party 102. "<Description>" may indicate the description of the party 102 or the description of the transaction e-mail address 252. "<return URL>" may indicate a web page to which the user 106 is returned to after the completion of the transaction e-mail address 252 inclusion. It is to be understood that other URL link pattern or link pattern may be used without departing from the scope of embodiments of the invention. Similarly, the link delimiters (e.g., "/" or "&") may be modified without departing from the scope of embodiments of the invention.

In another embodiment, the e-mail provider 104 may provide the structure or the syntax of the link in advance and the party 102 may insert the appropriate information before directing the user 106 to log-in into the e-mail account. For example, suppose the user 106 chooses to enter the e-mail address in the field 224, the transaction server 114 may parse the information in the field 224 collected from the user 106 by identifying the "username" and "domain name" from the entered e-mail address. The transaction server 114 may next place the appropriate information to the link according to the structure of the link. Similarly, if the user 106 chooses to enter the information via fields 226 and 228, the information collected in these fields will be placed in the link according to the structure thereof. In a further embodiment, the party 102 and the e-mail provider 104 may have a business relationship or arrangement where the user 106 may have already logged into an enterprise domain such that the party 102 and the e-mail provider 104 are just one of the services available within the enterprise domain. For example, the enterprise domain may include an online market place where users can make purchases online and an e-mail communication service where users can sign up e-mail accounts and send e-mail messages. In this situation, after activating the "next" button 230, the user 106 may be taken directly to the e-mail account of the user 106 where junk/non-junk mail list is processed and the transaction e-mail address 252 from the party is automatically included in the non-junk mail list.

Figure 4:
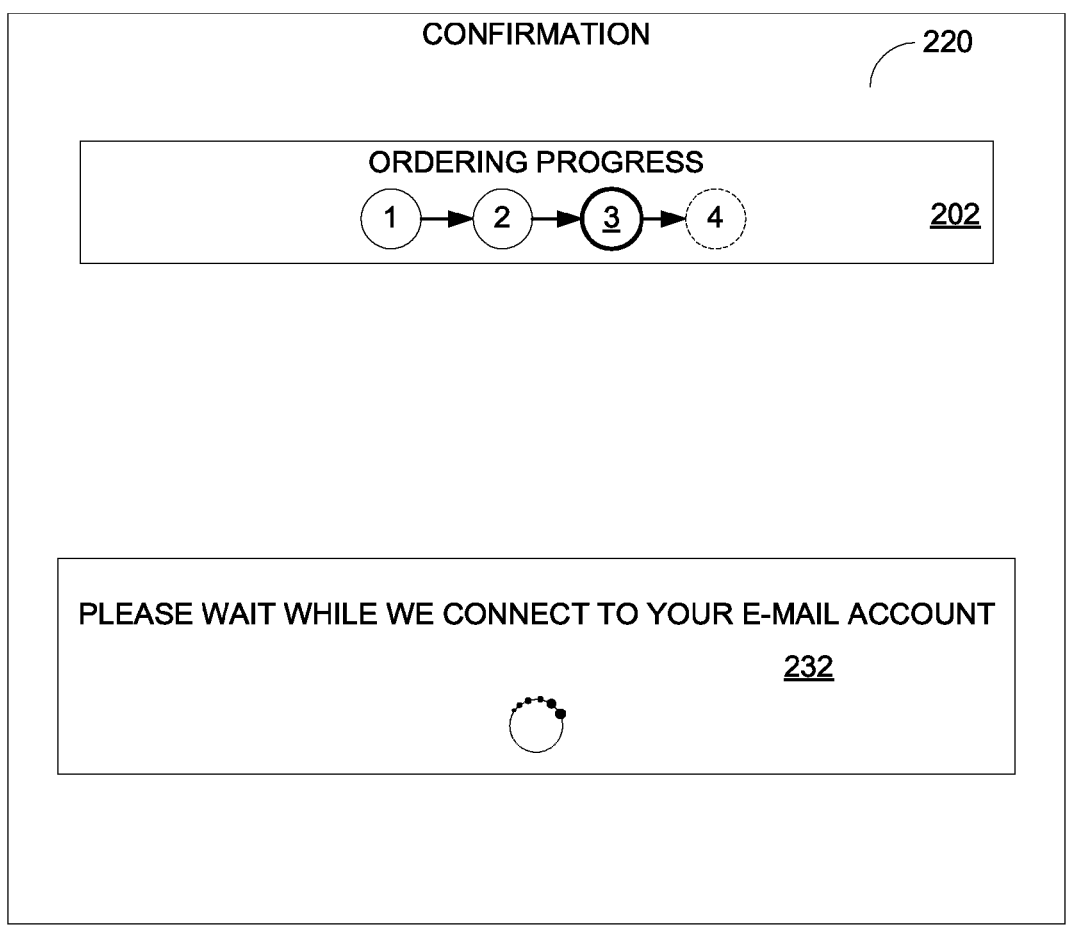
Figure 5:
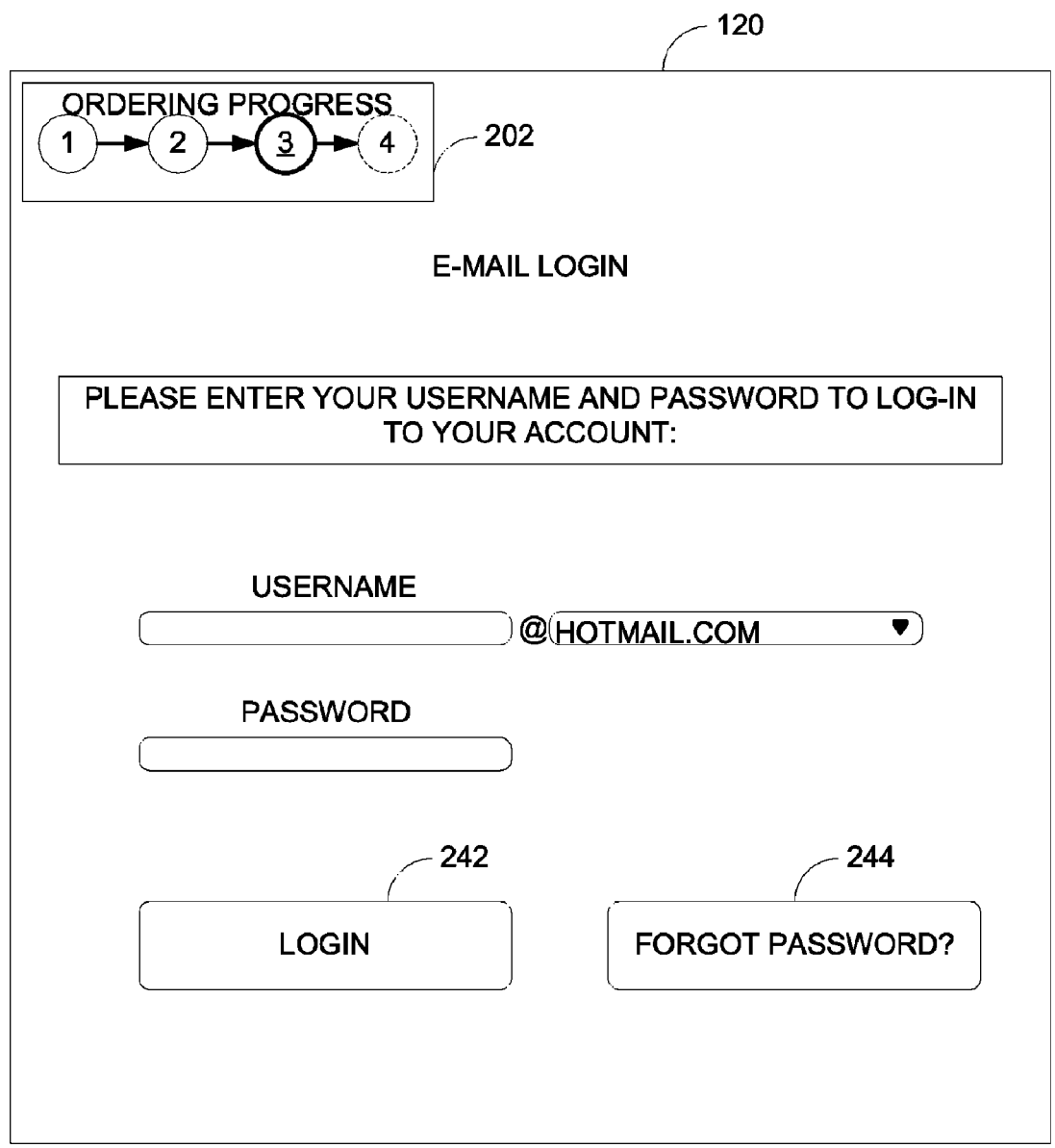

In the situation where the user 106 is directed to log-in to the e-mail account of the user 106, the user 106 may see a message 232 indicating that the user 106 is being directed to a log-in page 120 (shown in FIGS. 1 and 5) of the e-mail provider 104, as shown in FIG. 4. FIG. 5 describes a typical log-in page 120 in FIG. 5 for the user to log-in to the e-mail account. In one embodiment, the username of the e-mail account of the user 106 may be automatically entered by the e-mail provider 104 or the party 102 based on the information collected in fields 224 or 226. Once the user 106 enters the required credentials, the user 106 may select a "Log-in" button 242 to log-in to the e-mail account or a "forgot password" button 244 to ask the server 112 for assistance to retrieve the password. In one embodiment, the log-in page 120 is hosted by the server 112 and the server 112 maintains a status of the transaction that take place at the transaction server 116. For example, the party 102 and the e-mail provider 104 may have a further partnership where security or authentication schemes of secured transactions such as online purchases are seamlessly shared with each other. Under this partnership, the user 106 may smoothly transition from one web site to another web site. In another embodiment, the state may be maintained in conjunction with a client computer, such as a client computer 130 in FIG. 12, of the user 106. For example, the state may be maintained in conjunction with the cookie set by the party 102 and stored by the client computer (e.g., when the user 106 browses to the web site via a web browser). It is to be understood that, to maintain and protect the privacy of the user 106, appropriate notices are displayed, subject to various settings and configurations of the client computer, to the user 106 before reading or accessing information that is already stored on the client computer of the user 106.

In another embodiment, the location where the state information 202 is displayed may be hosted and controlled by the party 102. In other words, while the page 120 may be hosted by the e-mail provider 104, the server 112 may include appropriate code within the page 120 to directly allow the party 102 to place the state information 202 on the log-in page 120.

Figure 6:
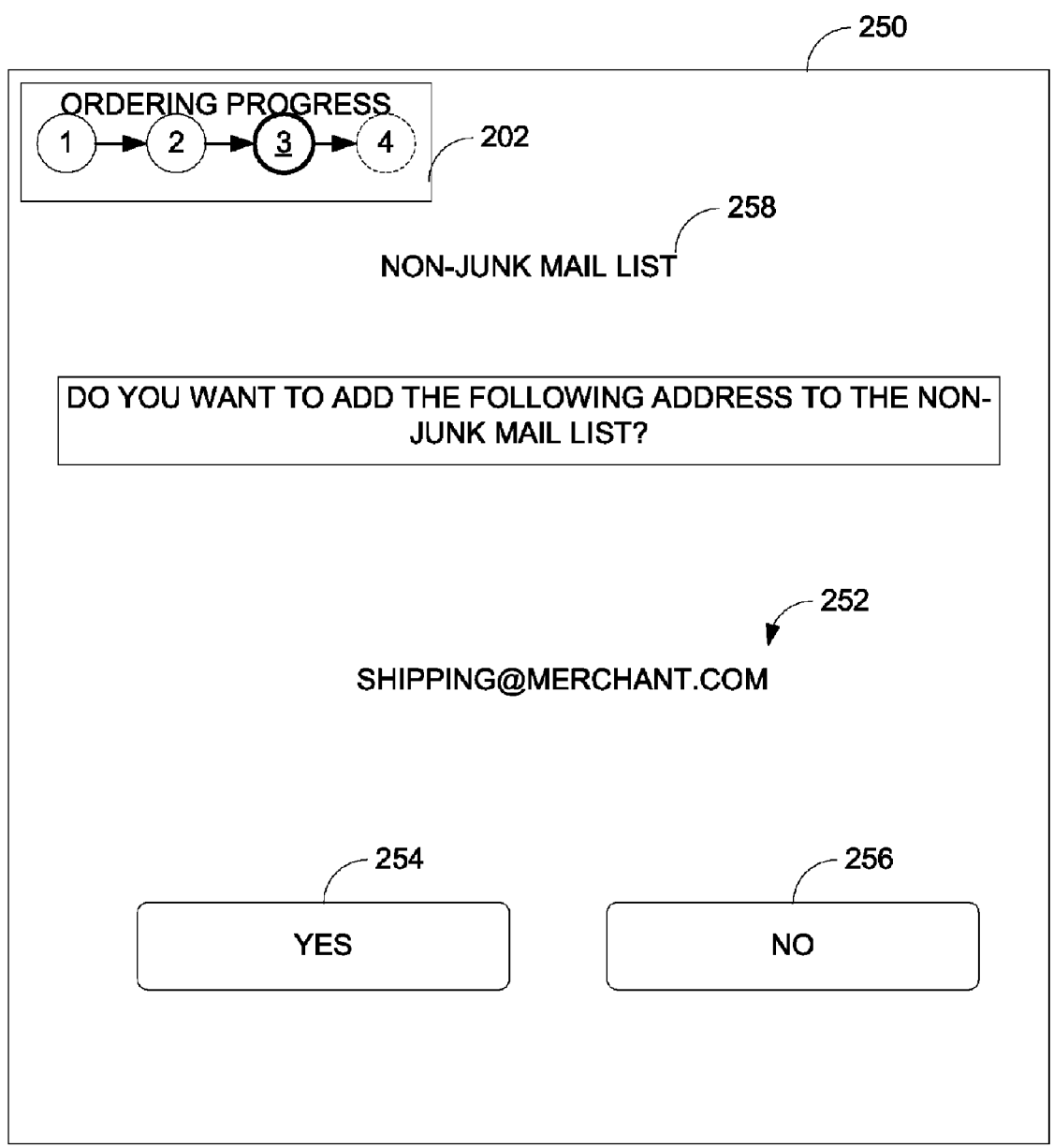
Figure 7:
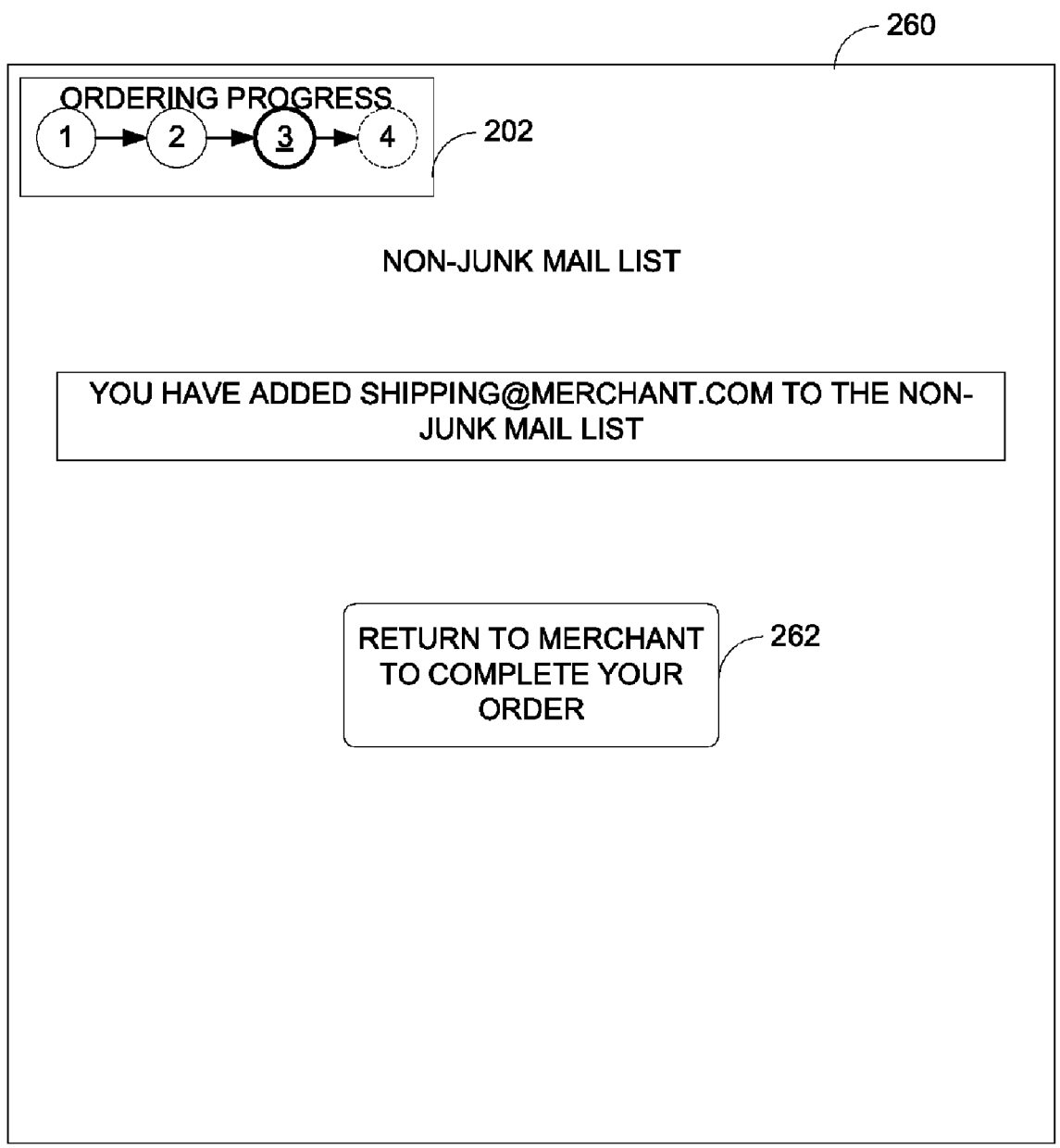

Referring now to FIG. 6, the user 106 is presented with a page 250 to include the transaction e-mail address 252 to a non-junk mail list 258. In one embodiment, the non-junk mail list 258 may be also known as an e-mail whitelist or safelist which is a list of e-mail addresses that are deemed acceptable by the user 106. The user 106 may choose a "YES" button 254 to add the transaction e-mail address 252 to the non-junk mail list 258 or a "NO" button 256 to reject the inclusion of the transaction e-mail address 252 to the non-junk mail list 258. Once the user 106 selects the "YES" button 254, a page 260 is displayed to the user 106 indicating that the inclusion of the transaction e-mail address to the non-junk mail list 258 is successful in FIG. 7. The user 106 may select a button 262 to return to the party to complete the transaction. In an alternative embodiment, the user 106 may be automatically redirected back to the transaction server 116 after a short delay (e.g., 5 seconds) in response to the <returnURL> information provided by the transaction server 116. For example, the returned page represented by the <returnURL> may be the final stage or step in the transaction workflow of the transaction. In a further alternative embodiment, the <returnURL> may be determined as a function of the state information 202.

For example, the state information 202 may be linked to a <returnURL> and depending on the state or status the user 106 is in, the <returnURL> may change corresponding to the state information 202.

Figure 8:
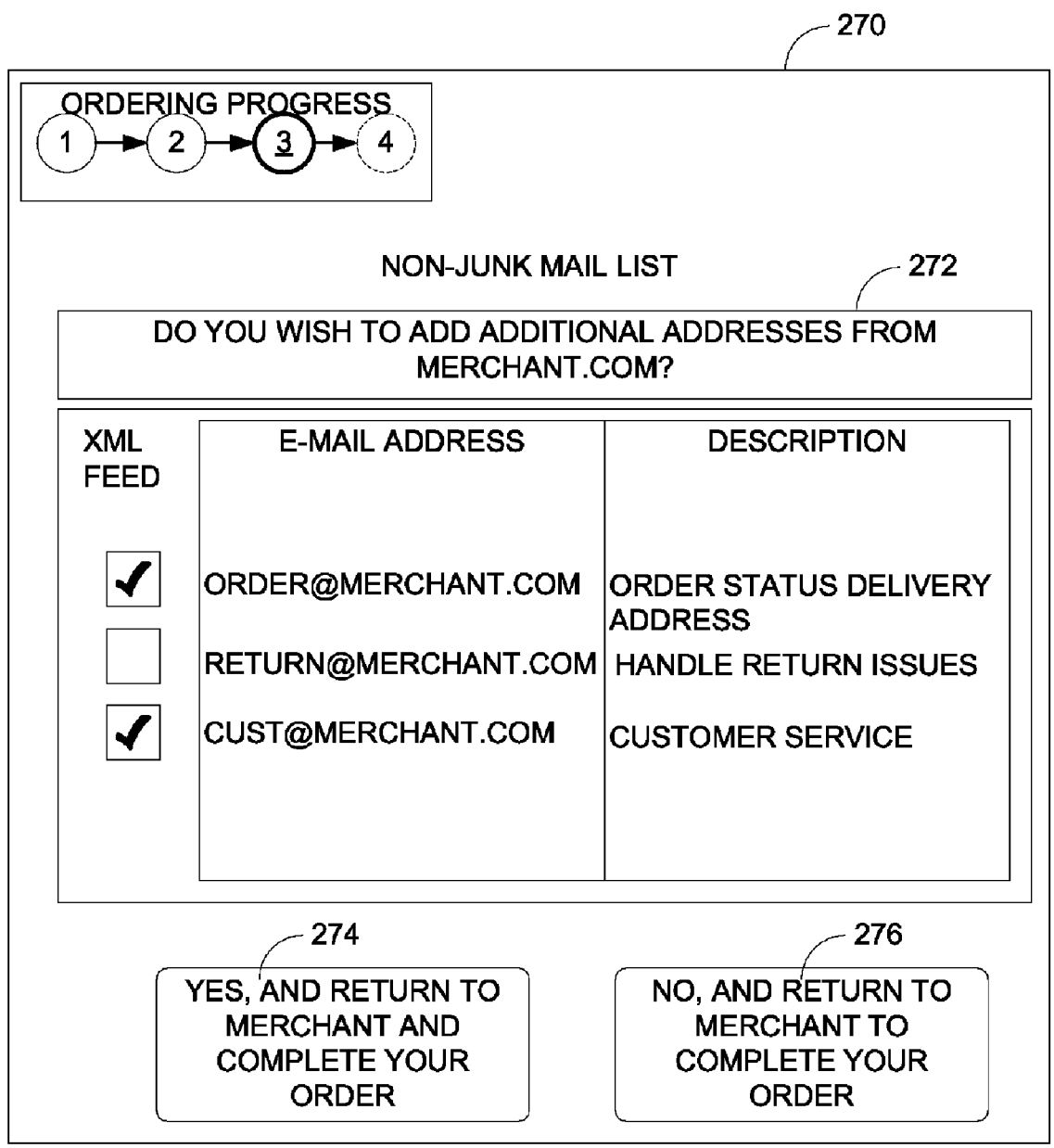

In an alternative embodiment, the transaction server 116 may further provide additional transaction e-mail addresses to the user 106 for consideration such as those shown in FIG. 8. For example, an additional list 272 may provide one or more transaction e-mail addresses to the user 106 for further consideration, such as "order merchant[dot]com" or "return@merchant[dot]com". In one embodiment, the additional list 272 may be provided via a web feed, such as an XML feed. It is to be understood that the web feed may be provided at a later time. For example, the additional list 272 may be written in an extensible markup language (XML) format such as the following:

```
<sender>
<record>
<address>foo@bar.com</address>
<company>Foo Bar</company>
<description>E-mail address used for order confirmations</description>
</record>
<record>
..
/record>
/sender>
```

The user 106 is also presented with appropriate buttons 274 and 276 to indicate the decision to include additional transaction e-mail addresses. In a further embodiment, the e-mail provider 106 may provide a richer user experience by requesting if the user 106 wishes to automatically file all messages sent from the transaction e-mail address 252 into a folder or folders within the user's e-mail account that the user 106 can periodically review and archive without having e-mail messages from the transaction e-mail address 252 fill the inbox of the user's e-mail account unintentionally.

Referring now to FIG. 9, an order completion page 900 illustrates the last step of the transaction workflow indicating the user 106 has completed the ordering process. The state information 202 correspondingly displays the correct state, the state "4," which indicates that the user 106 has completed or finished the ordering process. Advantageously, embodiments of the invention introduce a workflow or process that will allow merchants or parties (e.g., party 102) to provide a seamless experience for adding the e-mail address required for communicating with the customer to customer's safe list or the non-junk mail list. In one embodiment, an "Add to Safe List" button may appear on merchant's or party's web site and will lead customers to pages, such as the page 220. The pages will allow confirming the addition of the incoming e-mail address to the safe list, specifying the time interval for allowing e-mails from this merchant to come through, and possibly selecting a destination folder for this type of e-mail messages.

Referring now to FIG. 10, a flow diagram illustrates operations to effectively include a transaction electronic mail (e-mail) message to a non-junk mail list of an email account of a user according to an embodiment of the invention. At 1002, a transaction server from a merchant or party interacts with the user (e.g., user 106) to complete a business transaction at a transaction web site of the party. The business transaction includes a plurality of transaction steps, such as a transaction workflow). The transaction server defines a confirmation step being a step in the plurality of transaction steps to complete the business transaction at 1004. In one embodiment, the confirmation step may be the second to last step in the plurality of steps. At 1006, a request associated with the defined confirmation step is provided to the user. The request includes adding a transaction e-mail address to the non-junk mail list of the user's e-mail account. The transaction e-mail address is associated with the transaction e-mail message and includes transaction information relating to the confirmation step. At 1008, the adding further includes receiving the e-mail account from the user. Properties of the received e-mail account are identified at 1010, and the identified properties include log-in information of the received e-mail account. At 1012, the e-mail provider of the e-mail account interacts with the user to log-in to the received e-mail account. At 1014, the e-mail provider interacts with the user to include the transaction e-mail address to the non-junk mail list of the e-mail account of the user.

FIG. 11 is an exemplary flow chart illustrating operations of effectively including a transaction e-mail address to a non-junk mail list of a user by an e-mail provider working in cooperation with a party transacting with the user according to an embodiment of the invention. At 1102, the e-mail provider (e.g., e-mail provider 104) receives a request from a party for adding a transaction e-mail address to the non-junk mail list of the e-mail account of the user. The party provides a transaction web site for interacting with the user to complete a business transaction at the transaction web site of the party at 1104. The business transaction includes a transaction workflow having one or more steps therein at 1106. The party defines a confirmation step being a step or a second to last step in the workflow to complete the business transaction, and the received request is associated with the defined confirmation step at 1108. The transaction e-mail address is associated with the transaction e-mail message and including transaction information relating to the confirmation step at 1108. At 1110, in response to the received request, the e-mail provider provides the following information to the party: a domain of the e-mail address, an end point associated processes the received request, and a log-in web site for the user to log-in to the e-mail account. At 1112, the e-mail provider interacts with the user to log-in to the log-in web site. The e-mail provider further interacts with the user to include the transaction e-mail address to the non-junk mail list of the e-mail account of the user at 1114.

FIG. 12 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 12 illustrates operating system 144, application programs 146, other program modules 148, and program data 150.

The computer 130 may also include other removable/non-removable, volatile/nonvolatile computer storage media. For example, FIG. 12 illustrates a hard disk drive 154 that reads from or writes to non-removable, nonvolatile magnetic media. FIG. 12 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 12, provide storage of computer readable instructions, data structures, program modules and other data for the computer 130. In FIG. 12, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 12 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 12 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures, such as FIG. 10, to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method to effectively include a transaction electronic mail (e-mail) message to a non-junk mail list of an existing email account of a user, said method comprising:
    interacting with the user to start to complete a business transaction at a transaction web site of a party, said business transaction including a plurality of transaction steps;
    defining a confirmation step being a step in the plurality of transaction steps to complete the business transaction;
    providing a request associated with the defined confirmation step to the user to add a transaction e-mail address to the non-junk mail list of the existing email account of the user, said transaction e-mail address being associated with the transaction e-mail message sent by the transaction web site and including transaction information relating to the confirmation step, wherein said adding comprises:
        receiving the existing e-mail account of the user from the user, said e-mail account having an e-mail address associated therewith;
        identifying properties of the received existing e-mail account, said identified properties including log-in information of the received existing e-mail account;
        generating a link directing the user to log-in to the existing e-mail account of the user, said generated link including at least a domain of the existing e-mail address, an end point that processes the provided request, the existing e-mail account of the user, and a return uniform resource locator;
        interacting with the user to log-in to the received existing e-mail account using the generated link;
        interacting with the user to include the transaction e-mail address to the non-junk mail list of the received existing e-mail account of the user; and
        in response to interacting with the user to include the transaction e-mail address to the non-junk mail list, directing the user to a web page associated with return uniform resource locator.

2. The method of claim 1, further comprising providing a list of potential e-mail account providers to the user, and further comprising receiving a selection from the provided list from the user.

3. The method of claim 2, wherein interacting with the user to log-in comprises interacting with the user to log-in to the existing e-mail account in response to the received selection from the provided list, said interacting including automatically directing the user to a web site of the provider of the existing e-mail account from the transaction web site.

4. The method of claim 1, further comprising suggesting additional e-mail addresses from the party in response to said adding.

5. The method of claim 1, further comprising providing a web feed to the user in response to said adding, said web feed including a list of address and descriptions thereof for the user to consider to be included in the non-junk mail list.

6. The method of claim 1, further comprising directing the user back to the transaction web site as a last step to complete the business transaction, said last step indicating the confirmation step has completed and that the transaction e-mail address has been successfully included in the non-junk mail list of the existing user e-mail account.

7. A system to effectively include a transaction electronic mail (e-mail) message to a non-junk mail list of an existing email account of a user, said system comprising:
    at least one e-mail provider server from an e-mail provider for providing the existing e-mail account of the user, said existing e-mail account having an e-mail address associated therewith;
    at least one transaction party server for interacting with the user to start to finish a business transaction at a transaction web site of a party, said business transaction including a transaction workflow having one or more steps therein;
    wherein the at least one transaction party server defines a confirmation step being a second to last step in the workflow to finish the business transaction;
    wherein the at least one transaction party server provides a request associated with the defined confirmation step to add a transaction e-mail address to the non-junk mail list of the existing email account of the user, said transaction e-mail address being associated with the transaction e-mail message sent by the transaction web site and including transaction information relating to the confirmation step, wherein said adding comprises:
        receiving e-mail account information for the existing email account of the user from the user, said received existing e-mail account information identifying the at least one e-mail provider server;
        generating a link directing the user to log-in to the existing e-mail account of the user at the at least one e-mail provider server, said generated link including at least a domain of the existing e-mail address, an end point associated with the at least one e-mail provider server that processes the provided request, the existing e-mail account of the user, and a return uniform resource locator;

interacting with the user to log-in to the received existing e-mail account with the at least one e-mail provider server using the generated link; and interacting with the user to include the transaction e-mail address to the non-junk mail list of the received existing e-mail account of the user;

wherein the at least one e-mail provider server directs the user to a location corresponding to the return uniform resource locator as a last step of the workflow to complete the business transaction, said last step indicating that the confirmation step is complete and indicating that the transaction e-mail address has been successfully included in the non-junk mail list of the existing user e-mail account.

8. The system of claim 7, wherein the at least one transaction party server further provides a list of additional e-mail account providers to the user, and further comprising receiving a selection from the provided list from the user.

9. The system of claim 8, wherein the at least one transaction party server interacts with the user to log-in to the existing e-mail account in response to the received selection from the provided list, said interacting including automatically directing the user to a web site of the provider of the existing e-mail account from the transaction web site.

10. The system of claim 7, wherein the at least one transaction party server further suggests additional e-mail addresses from the party in response to said adding.

11. The system of claim 7, wherein the at least one transaction party server further provides a web feed to the user in response to said adding, said web feed including a list of address and descriptions thereof for the user to consider to be included in the non-junk mail list.

12. The system of claim 7, wherein the at least one e-mail provider server and the at least one transaction party server maintains a transaction status as a function of the transaction workflow.

13. A method to effectively include a transaction electronic mail (e-mail) message to a non-junk mail list of an existing email account of a user, said method comprising:

receiving a request from a party for adding a transaction e-mail address to the non-junk mail list of the existing e-mail account of the user, said party providing a transaction web site for interacting with the user to start to complete a business transaction at the transaction web site of the party, said business transaction including a transaction workflow having one or more steps therein, wherein the party defines a confirmation step being a second to last step in the workflow to complete the business transaction, wherein the received request is associated with the defined confirmation step, said transaction e-mail address being associated with the transaction e-mail message sent by the transaction web site and including transaction information relating to the confirmation step, said request further includes an address of the transaction web site and the existing e-mail account of the user;

in response to the received request, populating a link received from the party with information related to the existing e-mail account of the user, said link directing the user to log-in to the existing e-mail account of the user, said link including at least a domain of the e-mail address associated with the existing e-mail account of the user, an end point that processes the received request, a log-in web site for the user to log-in to the existing e-mail account of the user, and a return uniform resource locator corresponding the transaction web site;

interacting with the user to log-in to the log-in web site using the populated link;

interacting with the user to include the transaction e-mail address to the non-junk mail list of the e-mail account of the user, said interacting including an indication that the transaction e-mail address has been successfully included in the non-junk mail list of the user e-mail account; and receiving additional e-mail addresses from the party in response to the transaction e-mail address being included in the non-junk mail list of the existing e-mail account of the user, said additional e-mail addresses including e-mail addresses for the user to consider to be included in the non-junk mail list.

14. The method of claim 13, further receiving a web feed from the party to the user in response to the transaction e-mail address being included in the non-junk mail list, said web feed including a list of address and descriptions thereof for the user to consider to be included in the non-junk mail list.

15. The method of claim 13, further comprising maintaining a state of the transaction workflow as a function of the confirmation step.

16. The method of claim 15, further comprising directing the user to a location corresponding to the return uniform resource locator in the populated link as a last step of the workflow to complete the business transaction as a function of the maintained state, said last step indicating the confirmation step has completed and that the transaction e-mail address has been successfully included in the non-junk mail list of the existing user e-mail account.

17. The method of claim 13, wherein providing the following information comprises providing the following information to the party in a uniform resource identifier pattern or a uniform resource locator pattern: a domain of the e-mail address associated with the existing e-mail account, an end point associated processes the received request, and a log-in web site for the user to log-in to the existing e-mail account.

* * * * *